United States Patent [19]

Paul Dubois Taine et al.

[11] Patent Number: 5,657,474

[45] Date of Patent: Aug. 12, 1997

[54] TRANSACTIONAL PROTOCOL AND SYSTEM FOR IMPLEMENTING IT

[75] Inventors: Benoit Paul Dubois Taine, Bourg La Reine; Louis Bouveret; Souheil Marine, both of Paris, all of France

[73] Assignee: Alcatel Cit, Paris, France

[21] Appl. No.: 560,577

[22] Filed: Nov. 20, 1995

[30] Foreign Application Priority Data

Nov. 21, 1994 [FR] France ................... 94 13900

[51] Int. Cl.⁶ ................................................ G06F 12/00
[52] U.S. Cl. .................. 395/490; 395/726; 395/617; 395/479; 395/474
[58] Field of Search ............................... 395/490, 726, 395/617, 479, 474

[56] References Cited

U.S. PATENT DOCUMENTS

| | | | |
|---|---|---|---|
| 5,220,657 | 6/1993 | Bly et al. ........................ | 395/479 |
| 5,247,672 | 9/1993 | Mohan ........................... | 395/650 |
| 5,459,871 | 10/1995 | Van Den Berg ................. | 395/650 |
| 5,465,328 | 11/1995 | Dievendorff et al. ............ | 395/182.13 |
| 5,596,754 | 1/1997 | Lomet ............................ | 395/726 |

OTHER PUBLICATIONS

Cabrera et al, "Implementing Atomicity in Two Systems: Techniques, Tradeoffs and Experience", *IEEE Transactions on Software Engineering*, vol. 19, No. 10, Oct. 1993, New York pp. 950–961.

"Multigranularity Locking Divergence Control for Epsilon Serializability", *IBM Technical Disclosure Bulletin*, vol. 36, No. 6B, Jun 1993, New York, US p. 563–568, XP 000377483.

*Primary Examiner*—Tod R. Swann
*Assistant Examiner*—Denise Tran
*Attorney, Agent, or Firm*—Sughrue, Mion, Zinn, Macpeak & Seas

[57] ABSTRACT

A transactional protocol allocates write intention locks at the time of access to a transaction modifying data stored in a memory. These locks do not prohibit the allocation of read locks to other transactions. The other transactions can therefore read the old values of the variables until the new values are written into the memory when the transaction is closed. The time for which reading of data being modified is prohibited is restricted to the time to write the new values into the memory. This protocol is of particular benefit if the memory is a volatile memory and the modified data is backed up in another, non-volatile memory. In this case, the protocol further keeps up-to-date a table stored in the non-volatile memory and containing the identifiers of current transactions. This table is used to ensure that the data is consistent after failure of the volatile memory and contributes to maintaining a minimal time of prohibition of reading of data being modified. Applications of the protocol include telecommunication network control systems.

5 Claims, 5 Drawing Sheets

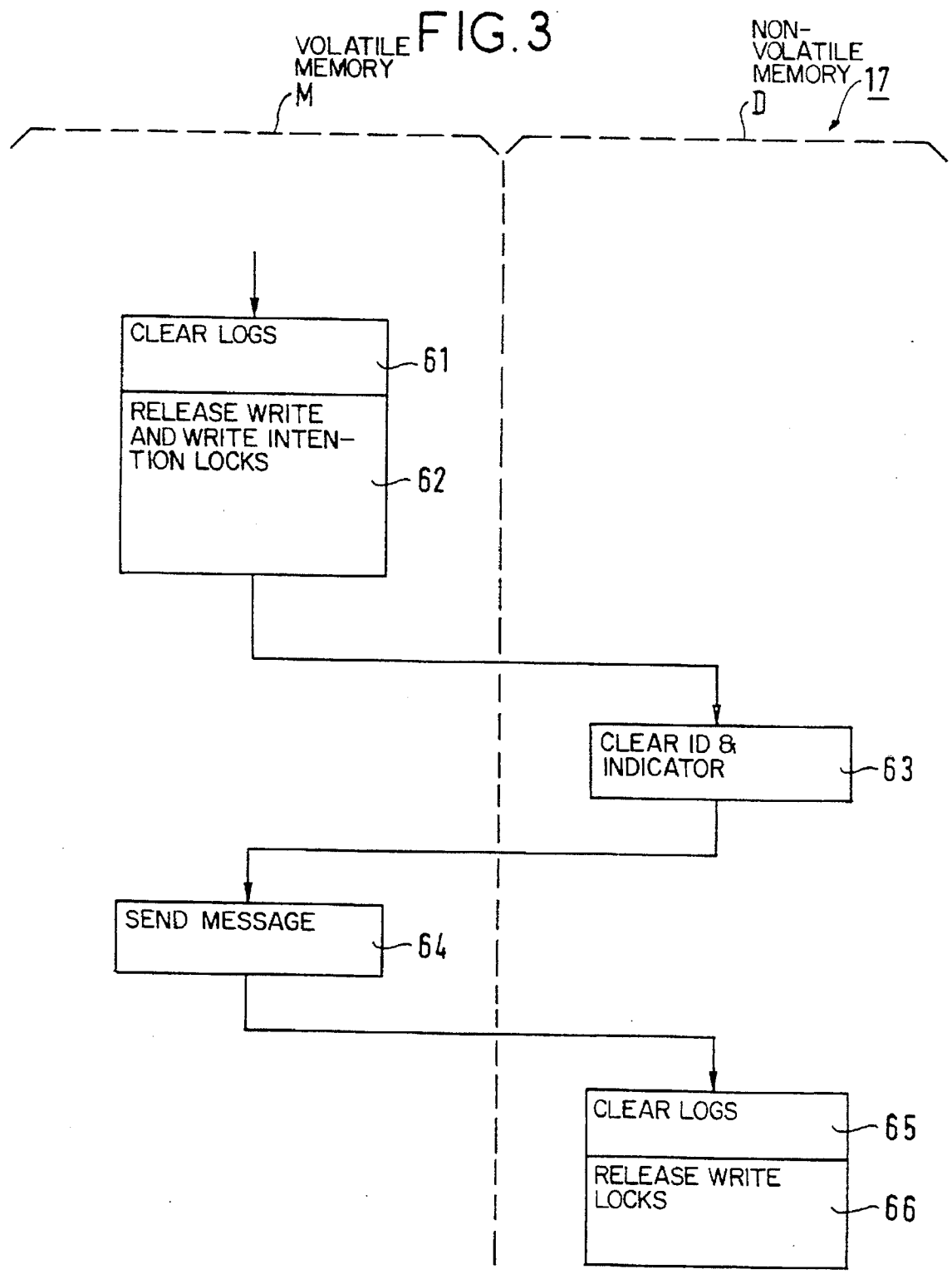

TRANSACTIONAL PROTOCOL AND SYSTEM FOR IMPLEMENTING IT

BACKGROUND OF THE INVENTION

1. Field of the Invention

The invention concerns a protocol for reading and writing data stored in volatile memory and possibly also in non-volatile memory.

2. Description of the Prior Art

The invention has a particular application to telecommunication network control systems. In a system of this kind, applications manipulate variables that are semi-permanent in the sense that their values are rarely modified. Reading therefore occurs much more frequently than writing. Also, reading must be effected in a very short time. What is read is mainly tables containing variables relating to users.

A set of read and/or write operations on variables requested by an application in one and the same request is called a transaction. If the values of a variable must be modified, a conventional transactional protocol includes the allocation to a given transaction, for a given register, of a write lock which is an exclusive right authorizing the transaction, and only that transaction, to read and to write the value stored in the register, for as long as the write lock exists. Write transactions must therefore wait if the value of the variable that they require to read is currently being modified by another transaction. This wait continues until the end of the transaction that makes the modification. Write operations therefore reduce the performance of read operations.

In a telecommunication network management system this problem is usually aggravated by the fact that the volatile memory is backed up by non-volatile memory. The data is stored in volatile semiconductor memory for fast access and backed up in non-volatile memory having a much longer access time. The volatile memory is associated with a processor. The volatile memory and the processor are both subject to failure, and failure of one leads to failure of the other. In the event of a failure all of the data contained in the volatile memory is lost.

The non-volatile memory usually comprises mirror disks associated with a disk controller responsible for the security of the stored data. It is accessible to any program run on the processor via a service providing access to the non-volatile memory. It is subject to much fewer failures than the processor/volatile memory combination.

Failure of the processor/volatile memory combination does not lead to failure of the non-volatile memory. Also, the non-volatile memory access service is available as soon as the processor is operating. This service has the following properties:

- requests to read or write the same data are strictly serialized;
- all requests elicit a response from the non-volatile memory access service when the request has been executed;
- the service guarantees that in the event of failure of the processor the request is either executed in full or not executed at all.

The data stored in the two memories includes variable values that can be read or written. Each value is stored in a logic register of the volatile memory and in a logic register of the non-volatile memory. It is therefore necessary to maintain the consistency of the value in volatile memory and the value in non-volatile memory, between the various variables and for each variable.

When an application has to read data it is sufficient to read it only in the volatile memory. Thus applications never write the non-volatile memory.

On the other hand, when an application wishes to modify data it is essential to modify it in the volatile memory and in the non-volatile memory so that the content of the volatile memory can be restored correctly after a failure. The problem then arises of sequencing the two operations of writing the new value relative to any operations to read the same variable in the volatile memory, which can be requested at virtually the same time by other applications.

At first sight it would seem essential to prohibit an application from reading the new value in the volatile memory before that value has been written both into the volatile memory and into the non-volatile memory. If a failure were to occur immediately after the writing of a new value into the volatile memory, but before the new data had been written into the non-volatile memory, restoring the content of the volatile memory would write the old value back into the volatile memory. Thus if reading of the volatile memory were permitted immediately after writing of the new value into it, without verifying that the value had also been written into the non-volatile memory, the reader application would obtain a value inconsistent with the content of the volatile memory, following the failure and the restore.

To maintain the mutual consistency of the data written into the two memories, it would therefore seem necessary to make any application requesting to read the value of a variable that is being modified by another application wait. This waiting time is long, however, since a non-volatile memory is usually made up of disks and has a much longer access time than volatile memory which is usually constructed from semiconductor flip-flops. This waiting time is not acceptable in telecommunication applications such as call processing, where the reaction time is a key quality criterion.

The transactional protocols used until now in telecommunication network control systems have neglected this waiting time problem. The problem has therefore had to be dealt with by each application, adding to the cost of developing and debugging each application.

The problem of maintaining the consistency of a set of modification and/or read operations performed on common data is encountered in the field of databases. It has been resolved by means of a transaction service.

The consistency requirements as defined above can be met by offering a so-called "atomic" transaction service. The expression "critical variables" refers to all the variables of a pair of transactions that can be accessed simultaneously by the two transactions. The execution of a plurality of transactions is said to be atomic if:

- For any pair of transactions, access to the critical variables of that pair of transactions by either of the two transactions is executed entirely before access to the same critical variables by the other transaction.
- In the case of a concurrent plurality of transactions or in the event of failure of the processor, either all of the operations constituting each transaction are executed or none of these operations are executed.

Each transaction comprises three phases:
- an opening phase;
- an access phase during which read or write operations are required and during which rights called read locks and write locks are allocated to the transaction for the register concerned;
- a closing phase during which the required reads and writes are executed and the corresponding locks are released.

The locks prohibit other operations that would compromise the consistency of the data. A read lock allocated to a given transaction for a given register is a non-exclusive right allocated to that transaction authorizing it to read the value stored in that register. Its essential function is to prohibit the allocation of a write lock to another transaction for the same register. A write lock allocated to a given transaction for a given register is an exclusive right allocated to that transaction authorizing it, and it only, to write a value into that register. A read lock can be allocated for a register only on condition that no write lock has already been allocated for that register. A write lock can be allocated for a register only if no write lock and no read lock have already been allocated for that register.

The requirement for transactions to be atomic, in this sense, can seriously degrade read performance. In the prior art transactional protocol previously described the exclusion of reading is effective immediately from access to data to be modified by a transaction and applies until closure of that transaction. The exclusion time can be long and is fixed not by the database management system but by the user. For some types of data, such as the data used for call processing in a telecommunication network, this inability to carry out read operations would be unacceptable.

The aim of the invention is to propose a transactional protocol allowing read access to a memory without waiting due to writing whilst preserving the atomic property of the transactions and that can be implemented in a data access service common to all sorts of applications.

Another aim, in connection with data stored identically in volatile memory and in non-volatile memory, is for the data to remain available and consistent after any short-term failure of the processor and the volatile memory. To be more precise, the aim of the invention is to define which data is to be stored in non-volatile memory and which data is to be stored in volatile memory and to define the protocol to be executed to read or write this data or to restore the content of the volatile memory after failure thereof or of the associated processor.

SUMMARY OF THE INVENTION

In a first aspect, the invention consists in a transactional protocol for data stored in a memory wherein, during a transaction including writing of a new value of at least one variable stored in a register of said memory, a read operation consists in, for each variable:

allocating a read lock prohibiting writing to said transaction for said register;

then reading the content of said register;

and a write operation consists in, for each variable:

allocating a write intention lock to said transaction for said register prohibiting writing in said register by any transaction other than said transaction, but allowing reading;

associating a log register with said register and storing therein said new value of said variable;

and the closure of said transaction essentially consists in:

determining each register to which a write intention lock has been allocated for said transaction to be closed;

releasing any write lock allocated to said transaction to be closed;

then, for any register holding a write intention lock, for said transaction to be closed, verifying that there remains no read lock allocated to any other transaction for said register; if at least one read lock remain for a time period exceeding a fixed limit, executing a procedure to abort said transaction to be closed; or otherwise converting said write intention lock into a write lock;

then, for any register holding a write lock for said transaction to be closed:

transferring said new value of said variable from said log to said register;

and releasing said write lock allocated to said transaction to be closed for said register;

then sending a "transaction deemed completed" message to an application that requested closure of said transaction;

and said procedure for aborting said transaction to be closed consists in, for any register holding a write lock or write intention lock:

clearing the content of each log storing the value of a variable modified by the aborted transaction;

then releasing write locks and write intention locks allocated to said aborted transaction;

then sending a "transaction aborted" message to said application that requested closure of said transaction.

The above protocol always provides fast access for reading the memory since the writing of a new value into the memory entails allocating a write lock only on closure of the transaction. Moreover, the time for which this lock applies is limited to the (short) time of copying the log into the register. Thus reading is not delayed by writing.

In a second aspect, the invention consists in a transactional protocol for data stored identically in a non-volatile memory and in a volatile memory wherein, during a transaction including writing of a new value of at least one variable stored in a first register of said volatile memory and in a second register of said non-volatile memory, a read operation consists in, for each variable:

allocating a read lock prohibiting writing to said transaction for said first register, then reading the value of said register;

and a write operation consists in, for each variable:

allocating to said transaction, for said first register, a write intention lock prohibiting writing in said first register by any transaction other than said transaction to be closed, but allowing reading;

associating with said first register a first log register and storing therein said new value of said variable;

and said closure of said transaction essentially consists in:

for any first register to which a write intention lock has been allocated by said transaction to be closed:

determining the corresponding second register in said non-volatile memory;

allocating to the second register thus determined a write lock for said transaction to be closed prohibiting reading and writing by any other transaction;

associating with said second register thus determined a second log register and storing therein said new value of said variable;

then writing the identifier of said transaction into a table of transactions stored in said non-volatile memory;

releasing any read lock allocated to said transaction to be closed;

then, for any first register holding a write intention lock, for said transaction to be closed, verifying that there remains no read lock allocated to any other transaction for said register, and, if at least one read lock remains during a time period exceeding a fixed limit, executing a procedure to abort said transaction to be closed; and otherwise converting said write intention lock into a write lock;

then, for any first register holding a write lock, for said transaction to be closed:

transferring said new value of said variable from said log to said register;

and releasing said write lock allocated to said transaction to be closed for said register;

then sending a "transaction deemed completed" message to an application that requested closure of said transaction;

then writing in said table an indicator associated with said identifier of said transaction and indicating that the latter is deemed completed;

then, for any second register holding a write lock, for said transaction to be closed:

transferring said new value of said variable from said second log to said second register;

then releasing said write lock allocated to said transaction for said first register;

and finally clearing said identifier of said transaction in said table;

and the procedure for aborting said transaction to be closed consists in, for any first register:

clearing the content of each first log holding the value of a variable modified by the aborted transaction;

then releasing write intention locks and write locks allocated to said aborted transaction, for said first register;

clearing the identifier of said aborted transaction in said table;

then sending a "transaction aborted" message to said application that requested closure of said transaction;

then clearing the content of each second log storing the value of a variable modified by said aborted transaction;

then releasing write locks allocated to said aborted transaction for said second registers;

and the procedure for restoring the content of said volatile memory after failure thereof consisting in:

for any second register of said non-volatile memory, verifying if any write lock remains in said register, and:

if no write lock remains therein, allocating a write lock to the first register corresponding to said second register, then transferring the content of said second register into said first register and releasing said write lock;

if a write lock remains therein, determining if said lock belongs to a transaction the identifier of which is in said table of transactions; and:

if yes, transferring the content of said second log into said second register, then releasing said write lock, then allocating a write lock to the first register corresponding to said second register, then transferring the content of said second register into said first register, and releasing said write lock;

if no, clearing the content of said second log and then releasing said write lock;

finally, clearing all transaction identifiers in said table.

The above protocol provides fast access for reading the volatile memory in almost all cases, since writing a new value into the non-volatile memory entails allocating a write lock to the second register, but no write lock is simultaneously allocated to the first register. Only a write intention lock is allocated to the first register. This write intention lock is converted into a write lock on closure of the transaction. The write lock is retained only for the (short) time needed to transfer the content of the log into the volatile memory register.

Unlike a conventional write lock, a write intention lock does not prohibit reading in the first register. This read provides only the old value of the variable, but has the merit of immediately satisfying applications requesting to read. The applications requesting to read are made to wait very briefly, i.e. for the time needed to update the first register in the volatile memory. The time to access this volatile memory therefore remains very short, despite the updates.

From the point of view of the applications, the transaction to update a variable is deemed to have been completed as soon as the volatile memory has been updated. The non-volatile memory is updated afterwards, taking as much time as is needed to access this memory, without the applications being prevented from accessing the new value of the variable in the volatile memory.

A consistency problem would occur if the volatile memory failed before the non-volatile memory had been updated. This consistency problem would not occur in the event of reading by an application since an application never reads the non-volatile memory directly. It would occur after restoration of the volatile memory, however, if no precautions were taken in the operation to restore the content of the volatile memory from the content of the non-volatile memory.

The presence of a transaction identifier in the transactions table during restoration of the content of the volatile memory prohibits restoration temporarily, i.e. until updating of the non-volatile memory has been completed, i.e. if at least one new value had been written into a second log and had not been transferred into the second register associated with the second log before the time of the failure. The transactions table therefore enables a correct decision to be taken regarding the content of the second logs associated with the second registers.

The content of a second log is transferred into the associated second register if and only if the identifier of the transaction which wrote a new value into that log is still present in the transactions table. If not, the content of the second log can be deleted and ignored since the absence of that transaction identifier in the table guarantees that the decision to abort that transaction was taken before the failure. Thus the updating of the non-volatile memory can be completed, resulting in consistency with the new values written previously into the volatile memory and already accessible to the applications prior to the failure.

The protocol of the invention enables telecommunication network control applications, among others, to take full advantage of conventional database transactional protocols (atomicity, serializability, isolation and durability), without encountering prohibitive waiting times. The only case in which there is a waiting time perceptible to the applications is that in which the volatile memory is being restored after failure of the processor, i.e. during the transfer of data from the non-volatile memory to the volatile memory. This is a very rare case since it is related to the probability of having a write transaction that modifies a register backed up by a register on disk at the time the processor fails and this type of register is written very infrequently.

The invention further consists in respective systems for implementing each of the above protocols.

The invention will be better understood and other features of the invention will emerge from the following description of one example of implementation of the protocol, given with reference to the drawings.

BRIEF DESCRIPTION OF THE DRAWINGS

FIG. 3 shows a flowchart of the operations carried out during a procedure to abort a transaction.

DETAILED DESCRIPTION OF THE PREFERRED EMBODIMENT

Figure 1:
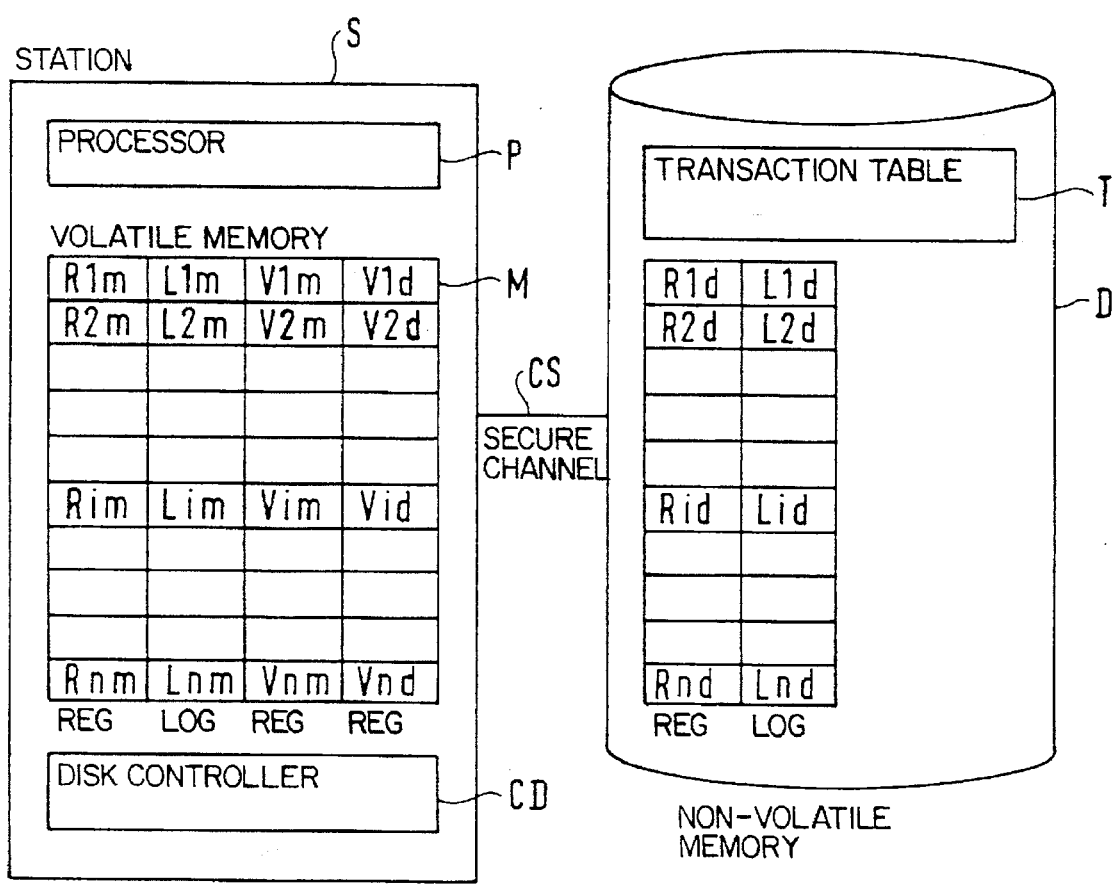
FIG. 1 is a diagram showing a data processing system using the protocol of the invention.

The data processing system shown by way of example in FIG. 1 includes one station S and a non-volatile memory D in the form of a set of disks, but the protocol of the invention can be used in any system of any size. The station S includes a processor P, a disk controller CD and a volatile memory M in the form of a random access memory constructed from semiconductor flip-flops, for example.

The connections inside the station S are not shown but are conventional. The processor P and the non-volatile memory D are connected by a secure channel CS in the conventional way. Failure of the processor P leads to failure of the volatile memory M and therefore to loss of the data that it contains. However, failure of the processor P does not lead to failure of the non-volatile memory D which is protected by the conventional system of mirror disks and by the secure channel CS.

The processor S runs software implementing the protocol of the invention and various application software packages. In a given transaction, applications use n variables $V1, \ldots, Vi, \ldots, Vn$ the values of which are stored in respective registers $R1m, R2m, \ldots, Rim, \ldots, Rnm$ in the volatile memory M and in registers $R1d, \ldots, Rid, \ldots, Rnd$ in the non-volatile memory D. This duplication "backs up" these values in the event of failure of the volatile memory M so that the content of the volatile memory M can be restored. A respective log register $L1m, L2m, \ldots, Lim, \ldots, Lnm$ is associated with each of the registers $R1m$ through $Rnm$. A respective lock register $V1m, V2m, \ldots, Vim, \ldots, Vmn$ in the volatile memory M is associated with each register $R1m$ through $Rnm$. The log stores a new value of the variable before it is written into the associated register.

A respective log register $L1d, \ldots, Lid, \ldots, Lnd$ in the non-volatile memory D is associated with each register $R1d$ through $Rnd$ of the non-volatile memory D. A respective lock register $V1d, \ldots, Vid, \ldots, Vnd$ in the volatile memory M is associated with each register $R1d$ through $Rnd$. In this example, the non-volatile memory D also contains a transaction table T for storing information relating to transactions that include write operations:

the identifier of each transaction, and an indicator of the outcome of the transaction.

In this example the indicator can take two values:

"outcome unknown" (the transaction may have been aborted), and

"transaction deemed completed", although in fact failure may have prevented its completion in the non-volatile memory.

When the indicator is cleared, either the transaction is completed in the non-volatile memory or the decision to abort has been taken and communicated to the user application.

The applications read or write the registers of the volatile memory M under the control of software implementing the transactional protocol of the invention, which has some features that are conventional in database access transactional protocols. It:

opens a transaction at the request of an application, allocating a single identifier to the transaction enabling the application to read or write the registers of the volatile memory M by virtue of the allocation of locks carrying this transaction identifier to show that those locks are allocated to that transaction, and closes the transaction at the request of the application, this closure instigating the actual read and write operations of the transaction and then releasing the corresponding locks.

The invention is more particularly concerned with the closure of a transaction. The protocol of the invention uses conventional read locks and write locks as defined hereinabove. It also uses a new type of lock, namely a write intention lock, which prohibits concurrent writing by any other transaction but allows reading by other transactions. In other words, a write intention lock can coexist with read locks. More than one read lock can exist at a time but a write lock cannot exist at the same time as any other lock.

When an application reads a volatile memory register as part of a transaction it must first acquire a read lock for that register. If a write lock has already been allocated to another transaction for that register, then the read request is queued until the write lock is released. There is a limit on the waiting time. If this limit is exceeded, the allocation of a read lock to the application is refused. For applications in the field of telecommunications, the waiting time must be short and refusal of a read request can only be tolerated if it is extremely rare.

When an application wishes to write a new value into a register as part of a transaction it must first acquire a write intention lock for that register. If a write intention lock or a write lock has already been allocated to another transaction for that register, then the write request is queued until that lock is released. There is a limit on the waiting time. If this limit is exceeded, the allocation of a write lock to the application is refused and the write request is refused.

In accordance with the invention, when a write intention lock has been allocated to a given transaction for a given register, the new value to be written is stored in the log associated with that register. Until this value is transferred into the register, other transactions can continue to read the old value in the register. Only the transaction holding the write intention lock is allowed to read the new value contained in the register. This property of the write intention lock is essential if it is to be possible to preserve the property of serializability of transactions whilst avoiding making reader applications wait.

Figure 2A:
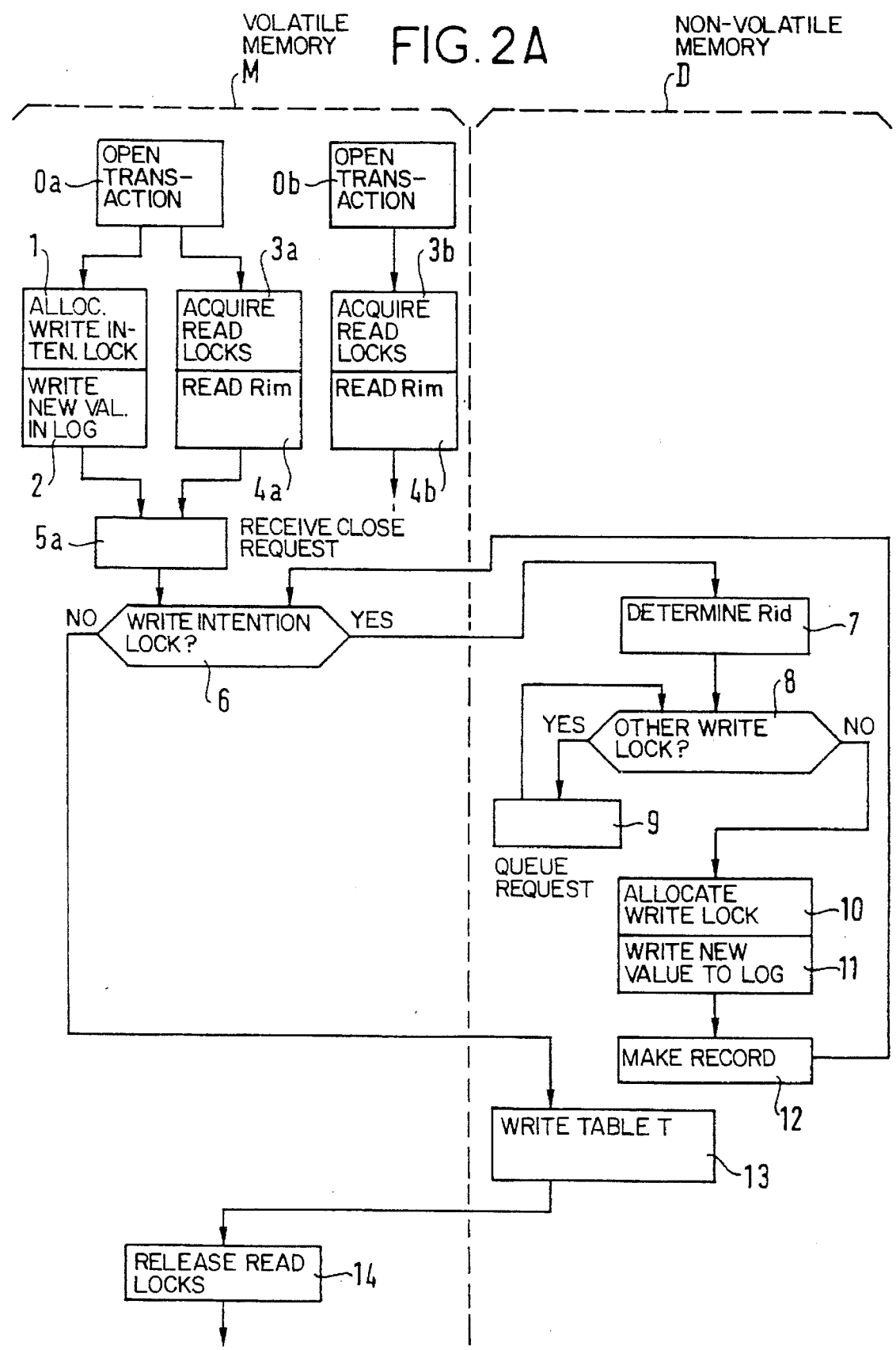
FIGS. 2A and 2B show a flowchart of the operations conducted during a transaction in one embodiment of the protocol of the invention in this example of a data processing system.
Figure 2B:
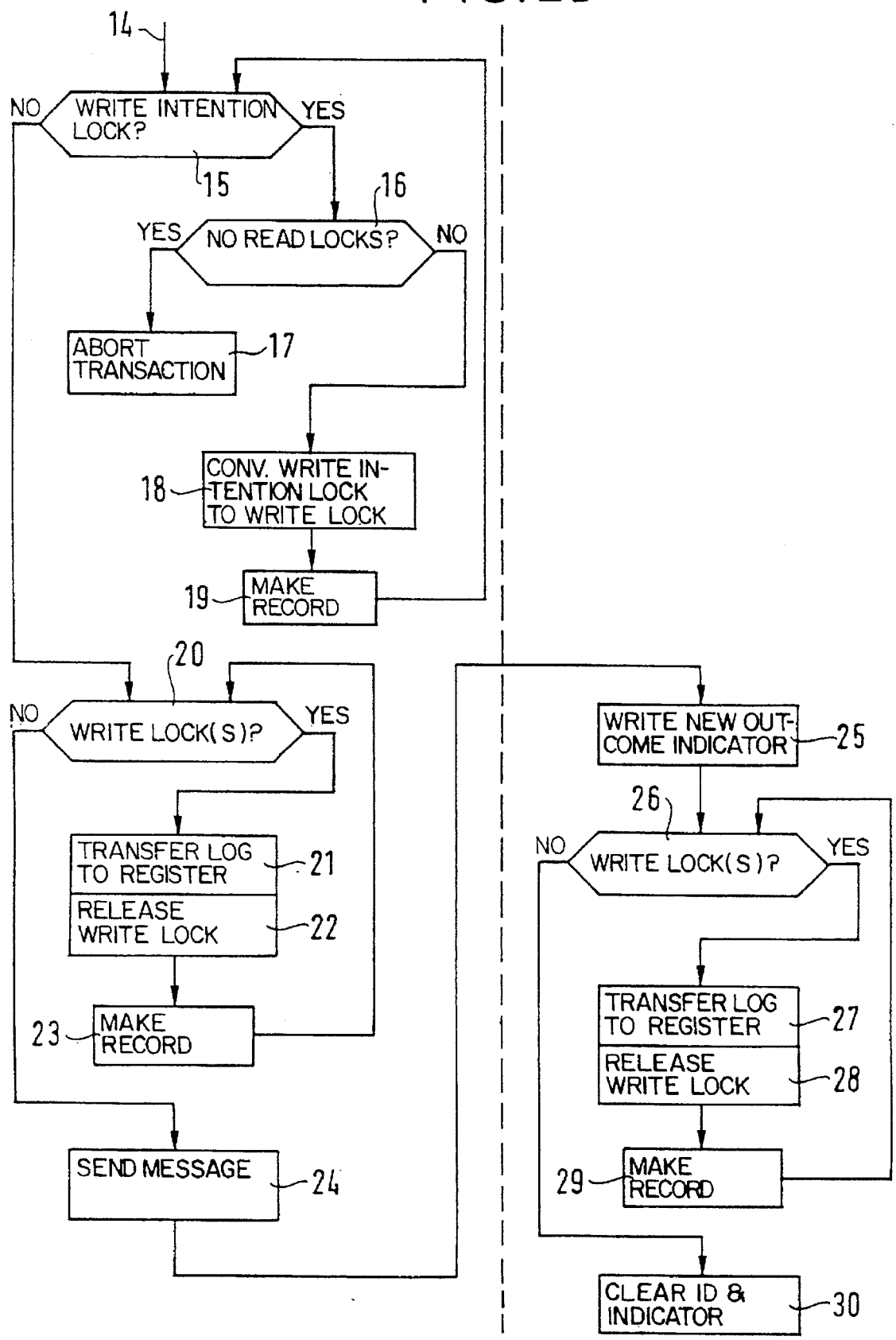

FIGS. 2A and 2B show a flowchart of the operations carried out before and after the closure of a given transaction a in one example of implementation of the protocol of the invention. The transaction a includes write operations and read operations. It is opened by an operation $0a$. A transaction b including only read transactions is opened at the same time as the transaction a, by an operation $0b$. This flowchart concerns only the closure of the transaction a. The transaction b is closed independently of the closure of the transaction a and its closure is not shown.

The lefthand part of FIGS. 2A, 2B, 3 and 4 shows operations concerning values stored in the volatile memory M. The righthand part shows operations concerning values stored in the non-volatile memory D.

The write operations of the transaction a to be closed must write the new values of n variables V1 through Vn in the memories M and D. At the start of the flowchart no access to the non-volatile memory D has yet been made and no write lock has yet been allocated, preventing the application from reading the volatile memory M.

The transaction a writes the volatile memory M. Writing a variable Vi is characterized by:

an operation 1 allocating a write intention lock to transaction a for the register Rim in the volatile memory M in which this transaction is to write the new value of the variable Vi.

an operation 2 writing the new value in the log Lim in the volatile memory M associated with the register Rim.

The write intention lock allows reading of the old value in the register Rim by applications requesting to read. The various transactions can therefore read the old value of each variable relevant to the transaction a in the volatile memory M. For example, the transaction b carries out the following operations to read a variable Vi in the volatile memory M that is currently being modified by the transaction a:

an operation 3b acquiring read locks for the register Rim containing the old value of the register (before the modification by transaction a is implemented).

an operation 4b reading this value in the register Rim.

Similarly, the transaction a can read the variable Vi by means of:

an operation 3a acquiring read locks for the register Rim containing the old value of the register (before the modification is implemented).

an operation 4a reading this value in the register Rim.

The phase of closing the transaction a includes the following operations:

reception 5a of the request to close this transaction, emitted by an application;

a test 6 in the volatile memory M on the content of the lock registers V1m through Vnm corresponding to the registers R1m through Rnm to determine a first write intention lock allocated to the transaction to be closed and to determine the first register Rim to which a lock of this kind refers;

if the test 6 finds a write intention lock:

an operation 7 determines the register Rid corresponding to the register Rim determined by the test 6;

a test 8 is then effected on the content of the lock register Vid to determine if it contains a write lock allocated to a transaction other than that to be closed, for the register Rid; if so, the write request emitted by the transaction to be closed is queued by an operation 9 until this lock is released;

if not, an operation 10 allocates a write lock to the transaction to be closed for the register Rid, this lock being written in the register Vid;

an operation 11 then writes the new value of the variable Vi in the log Lid;

an operation 12 then records the fact that the register Rid has been processed and the operations 6 through 12 are repeated until the write intention locks found in the lock register Vim by the test 6 have been dealt with;

if the write intention locks found by the test 6 have all been dealt with, an operation 13 writes into the table T in the non-volatile memory D: the identifier of the transaction to be closed and an outcome indicator indicating "outcome unknown", and this indicator will remain in force until the contents of all the logs L1d through Lnd have been transferred in full into the respective register R1d through Rnd, i.e. until the transaction can be regarded as completed;

an operation 14 in the volatile memory M then releases all the read locks that have been allocated to the transaction to be closed for registers R1m through R1n of the volatile memory M, to enable writing of new values into those registers.

FIG. 2B shows the operations that follow the operation 14 releasing the read locks held by the transaction to be closed:

a test 15 is carried out on the content of the lock registers Vim to determine if they contain at least one write intention lock allocated to the transaction to be closed and to determine the first register Rim to which a lock of this kind applies; if this test 15 does not find any write intention lock, a test 20 described below is carried out;

if the test 15 finds a first write intention lock, a test 16 verifies, after a fixed time-delay, that there remains no read lock allocated to any transaction in the register Rim concerned:

if at least one read lock remained at the end of the fixed time-delay, this closure phase terminates with a procedure 17 to abort the transaction, described below;

if no read lock remains, an operation 18 converts the write intention lock into a write lock, thereafter preventing any reading in the register Rim concerned; an operation 19 then records the fact that the register Rim has been processed and the operations 15, 16, 17, 18 are repeated until all the write intention locks found by the operation 15 have been dealt with.

The test 20 determines if the lock registers Vim contain at least one write lock allocated to the transaction to be closed and the first register Rim to which a lock of this kind applies; if no lock is found, an operation 24 described below is carried out;

if the test 20 finds at least one write lock, an operation 21 transfers the content of the log Lim into the corresponding register Rim to update the content of that register with the new value;

an operation 22 then releases the write lock allocated to the transaction to be closed for the register Rim;

an operation 23 then records the fact that the register Rim has been processed and the operation 20, 21, 22 are repeated until all of the write locks found by the operation 20 have been dealt with;

if the test 20 does not find any more write locks allocated to the transaction to be closed:

an operation 24 sends a "transaction deemed completed" message to the application which requested closure of the transaction, and that application may thereafter take decisions assuming that the transaction has been completed, although the transaction has not really been completed since the non-volatile memory D has not yet been updated;

an operation 25 then writes a new value of the outcome indicator associated with the identifier of the transaction to be closed into the table T; this new "deemed completed" value indicates, after any failure, that the application has received the message telling it that the transaction is deemed completed;

an operation 26 then determines if the lock registers Vid contain at least one write lock allocated to the transaction to be closed and the first register Rid to which a lock of this kind applies.

If the operation 26 finds a write lock:
  an operation 27 transfers the content of the log Lid into the register Rid of the non-volatile memory D;
  an operation 28 then releases the write lock associated with the register Rid concerned;
  an operation 29 then records the fact that the register Rid has been processed and the operations 26, 27, 28 are repeated until all the write locks found by the operation 26 have been dealt with.

If the operation 26 does not find any more write locks, an operation 30 clears the identifier of the transaction to be closed and the associated indicator in the table T; this means that the updating of the non-volatile memory D has been completed.

Note that the operation 25 which writes the "transaction deemed completed" value into the table T is not an indispensable feature of the protocol of the invention. This writing is used only for administration of the transactions table in the non-volatile memory, where the identifier of a transaction is cleared from this table (except in the case of an abort) when all of the modifications have been completed.

Note that this protocol prohibits reading in the volatile memory M only from the operation 18 converting write intention locks into write locks to the operation 22 which releases the write locks, i.e. for a very short time period, since the access time of a non-volatile memory is very short. The prohibition time does not depend in any way on the access time of the non-volatile memory D since the operation 11 writing new values into the logs Lid and the operation 27 transferring these new values into the registers Rid does not prohibit reading the volatile memory M.

The volatile memory M can fail at any time during the sequence of operations described above. In particular, it can fail after the operation 24 sending the "transaction deemed completed" message to the application and before the operation 27 transferring the content of the logs Lid into the registers Rid.

The following description of the restore procedure shows how the consistency of the data is established: either by completing the updating of the non-volatile memory D if no abort procedure 17 was effected before the failure, or by cancelling the preparations for updating the non-volatile memory D and restoring the old values into the volatile memory M if an abort procedure 17 has been partly executed before the failure.

FIG. 3 shows a flowchart of the operations of the procedure 17 for aborting a transaction that has reached the closure phase. This procedure includes the following operations:

an operation 61 which clears the content of the logs L1$m$ through Lnm held by the aborted transaction in the volatile memory M;
  an operation 62 which releases the write locks and the write intention locks associated with the registers R1$m$ through Rnm and held by the aborted transaction;
  then an operation 63 which clears in the table T in non-volatile memory D the identifier of the aborted transaction and the associated indicator;
  then an operation 64 which sends a "transaction aborted" message to the application that requested closure of the transaction;
  then an operation 65 which clears the contents of the logs L1$d$ through Lnd held by the aborted transaction in the non-volatile memory D; and
  finally, an operation 66 which releases the write locks held by the aborted transaction for the registers Rid through Rnd in the non-volatile memory D in order to cancel the preparations for updating of the n variables that should have been modified during the transaction that was aborted.

Note that if a transaction is aborted the application that requested its closure receives a "transaction aborted" message sent by the operation 64 only after the clearing 63 of the identifier transaction in the volatile memory D. As explained below, clearing the transaction identifier prevents updating of the non-volatile memory D by the restore procedure. Consequently, subsequent execution of the application will be consistent with the subsequent situation of the data in the non-volatile memory D.

Figure 4:
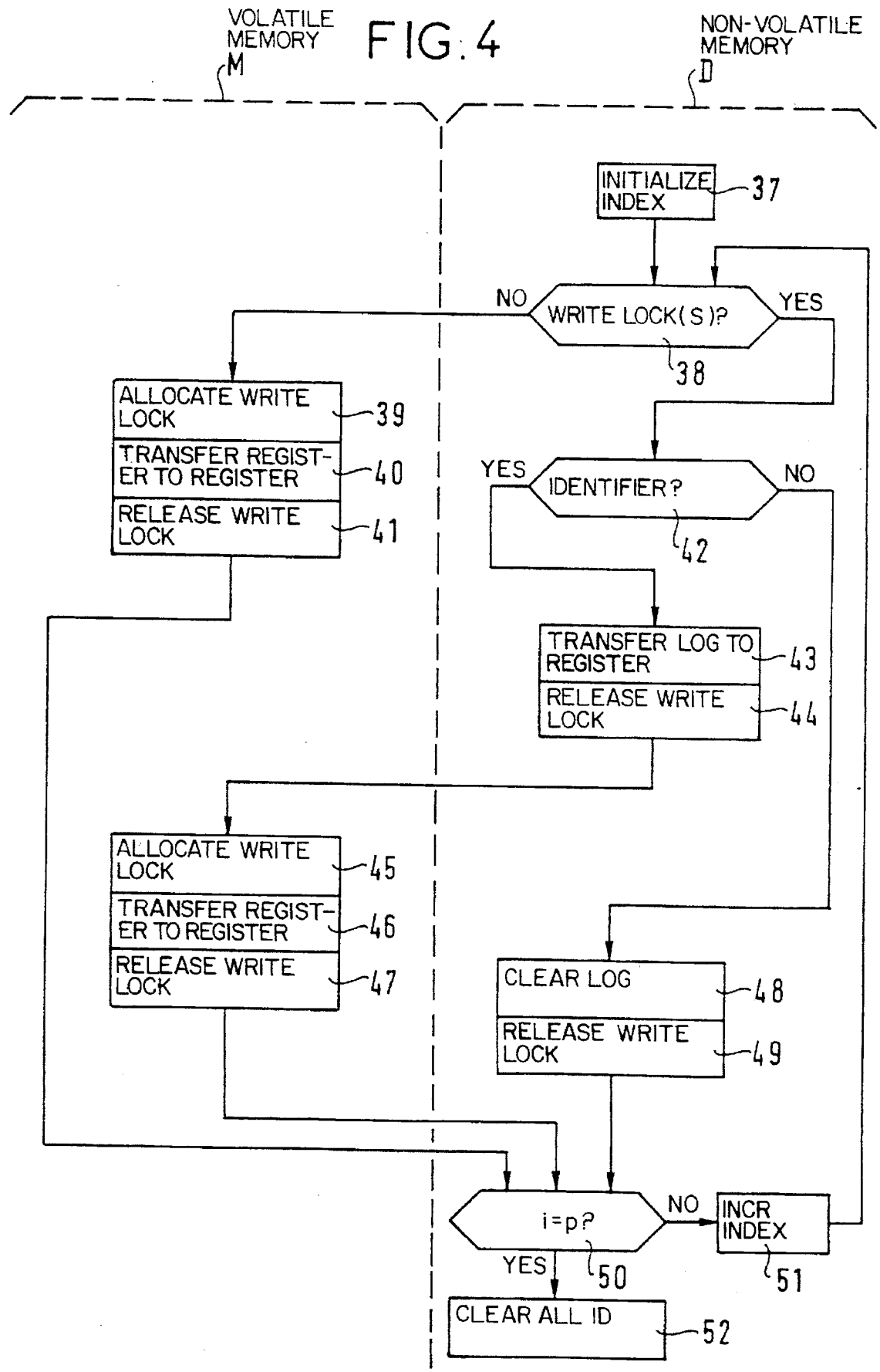
FIG. 4 shows a flowchart of the operations carried out to restore the content of the volatile memory following failure of that memory or of the associated processor.

FIG. 4 shows a flowchart illustrating one example of implementation of part of the transactional protocol of the invention, namely a procedure which restores the content of the volatile memory M after the latter has failed. The operations shown in this flowchart are repeated p times if there are p variables whose values are backed up in the non-volatile memory. These operations are:

an operation 37 that initializes to one the value of an index i;
  then an operation 38 which tests the content of the lock register Vid in the non-volatile memory D:
    If the lock register Vid does not contain any write locks, this means that the content of the log Lid has been transferred into the register Rid and therefore that updating of the value of the variable Vi in the non-volatile memory D had been completed before the failure, so that it is sufficient to restore this new value into the volatile memory M; an operation 39 allocates a write lock to the restore procedure for the register Rim; then an operation 40 transfers the content of the register Rid into the register Rim, to rewrite the new value of the variable into the volatile memory M; then an operation 41 releases the write lock for Rim; then an operation 50 described below is executed.
    If the lock register Vid contains a write lock, this means that the updating of this variable had not yet been done in the non-volatile memory D at the time of the failure; then an operation 42 reads the table T to determine if it still contains the identifier of the transaction to which this write lock was allocated:
      If the identifier of this transaction is present in the table T, this means that the updating of the non-volatile memory D has not been completed for the transaction; an operation 43 then transfers the content of the log Lid associated with this write lock into the register Rid associated with this write lock in order to update the content of the register Rid; an operation 44 then releases the write lock found in the register Vid by the operation 40; an operation 45 then allocates a write lock to this restore procedure in the lock register Vim; an operation 46 then transfers the content of the register Rid into the register Rim in the volatile memory M to update it in turn; finally, an operation 47 releases the write lock allocated by the operation 45.
      If the transaction identifier in question is not present in the table T, this means that an abort procedure 17 had been partly executed before the failure and that the preparations for updating the non-volatile memory D must therefore be cancelled; an operation 48 then clears the content of the log Lid; an operation 49 then releases the write lock found in the lock register Vid.

After the operation 41 or the operation 47 or the operation 49, an operation 50 tests the value of the index i which distinguishes between the p variables to which the modifications carried out by the transaction to be closed relate:

if i is less than p, an operation 51 increments the index i by one unit and the procedure is repeated from operation 40;

if i is equal to p, the procedure is terminated by an operation 52 which clears all the transaction identifiers in the table T in the non-volatile memory D.

Note that if the operation 42 finds that the identifier of the transaction corresponding to the write lock found by the operation 40 is absent from the table T, this necessarily means that an abort decision had been taken before the failure, which explains why the identifier has been cleared. The contents of the logs Lid allocated to that transaction must therefore be cleared if they had not been cleared before the failure. Of course, the content of these logs must not be used since a decision had been take to abort the transaction.

If the operation 42 finds that the identifier of the transaction corresponding to the write lock found by the operation 40 is present in the table T, and if the indicator has the value "transaction deemed completed", this means that the decision to close the transaction had been taken prior to the failure. The contents of the logs Lid allocated to that transaction must be transferred into the corresponding registers Rid if it had not been possible to transfer them before the failure. This enables subsequent copying of the contents of the registers Rid into the corresponding registers Rim to restore the content of the volatile memory M.

If the operation 42 finds that the identifier of the transaction is present in the table T and if the indicator has the value "outcome unknown", this means that the application has not received any "transaction aborted" message, since the operation 63 clearing the transaction identifier always precedes the operation 64 sending this message. On the other hand, the application may have received a "transaction deemed completed" message without the transaction identifier having been cleared and without the indicator taking the value "transaction deemed completed", since the operation 10 sending the message "transaction deemed completed" occurs some time before the operation 30 which clears the identifier of the transaction in the table T. It is then necessary to carry out the operations which complete closure of the transaction to make the data consistent in all cases: either the application has seen a "transaction deemed completed" message or it has not seen any message. In the latter case it has obviously not taken any decision incompatible with completion of the transaction.

In the embodiment described above, the lock registers Vid associated with the registers Rid of the volatile memory D are in the volatile memory M and not in the non-volatile memory D. It is necessary, after a failure, to detect the existence of any lock Vid allocated to a register Rid (operation 38 in FIG. 4). As the register Vid is in the volatile memory M, its content is lost on each failure. However, there is another way to determine if updating of the register Rid has been completed or not: the operation 38 then consists in determining if there is anything in the log Lid. If the content of the registers Lid is systematically cleared when it has been transferred into a register Rid, the presence of any content in a log Lid means that the register Rid has not been updated. There cannot be any content that was written into this log Lid after the failure.

The content of the lock register Vid can be restored in the volatile memory M by rewriting a write lock into this register, after detecting the presence of a content in the log Lid in the non-volatile memory D.

There is claimed:

1. Transactional protocol for data stored in a memory wherein, during a transaction including writing of a new value of at least one variable stored in a register of said memory, a read operation consists in, for each variable:

allocating a read lock prohibiting writing to said transaction for said register;

then reading the content of said register;

and a write operation consists in, for each variable:

allocating a write intention lock to said transaction for said register prohibiting writing in said register by any transaction other than said transaction, but allowing reading;

associating a log register with said register and storing therein said new value of said variable;

and the closure of said transaction essentially consists in:

determining each register to which a write intention lock has been allocated for said transaction to be closed;

releasing any write lock allocated to said transaction to be closed;

then, for any register holding a write intention lock, for said transaction to be closed, verifying that there remains no read lock allocated to any other transaction for said register; if at least one read lock remains for a time period exceeding a fixed limit, executing a procedure to abort said transaction to be closed; or otherwise converting said write intention lock into a write lock;

then, for any register holding a write lock for said transaction to be closed:

transferring said new value of said variable from said log to said register;

and releasing said write lock allocated to said transaction to be closed for said register;

then sending a "transaction deemed completed" message to an application that requested closure of said transaction;

and said procedure for aborting said transaction to be closed consists in, for any register holding a write lock or write intention lock:

clearing the content of each log storing the value of a variable modified by the aborted transaction;

then releasing write locks and write intention locks allocated to said aborted transaction;

then sending a "transaction aborted" message to said application that requested closure of said transaction.

2. Transactional protocol for data stored identically in a non-volatile memory and in a volatile memory wherein, during a transaction including writing of a new value of at least one variable stored in a first register of said volatile memory and in a second register of said non-volatile memory, a read operation consists in, for each variable:

allocating a read lock prohibiting writing to said transaction for said first register, then reading the value of said register;

and a write operation consists in, for each variable:

allocating to said transaction, for said first register, a write intention lock prohibiting writing in said first register by any transaction other than said transaction to be closed, but allowing reading;

associating with said first register a first log register and storing therein said new value of said variable;

and said closure of said transaction essentially consists in:

for any first register to which a write intention lock has been allocated by said transaction to be closed:
  determining the corresponding second register in said non-volatile memory;
  allocating to the second register thus determined a write lock for said transaction to be closed prohibiting reading and writing by any other transaction;
  associating with said second register thus determined a second log register and storing therein said new value of said variable;

then writing the identifier of said transaction into a table of transactions stored in said non-volatile memory;

releasing any read lock allocated to said transaction to be closed;

then, for any first register holding a write intention lock, for said transaction to be closed, verifying that there remains no read lock allocated to any other transaction for said register, and, if at least one read lock remains during a time period exceeding a fixed limit, executing a procedure to abort said transaction to be closed; and otherwise converting said write intention lock into a write lock;

then, for any first register holding a write lock, for said transaction to be closed:
  transferring said new value of said variable from said log to said register;
  and releasing said write lock allocated to said transaction to be closed for said register;

then sending a "transaction deemed completed" message to an application that requested closure of said transaction;

then writing in said table an indicator associated with said identifier of said transaction and indicating that the latter is deemed completed;

then, for any second register holding a write lock, for said transaction to be closed:
  transferring said new value of said variable from said second log to said second register;
  then releasing said write lock allocated to said transaction for said first register;

and finally clearing said identifier of said transaction in said table;

and the procedure for aborting said transaction to be closed consists in, for any first register:

clearing the content of each first log holding the value of a variable modified by the aborted transaction;

then releasing write intention locks and write locks allocated to said aborted transaction, for said first register;

clearing the identifier of said aborted transaction in said table;

then sending a "transaction aborted" message to said application that requested closure of said transaction;

then clearing the content of each second log storing the value of a variable modified by said aborted transaction;

then releasing write locks allocated to said aborted transaction for said second registers;

and the procedure for restoring the content of said volatile memory after failure thereof consisting in:

for any second register of said non-volatile memory, verifying if any write lock remains in said register, and:
  if no write lock remains therein, allocating a write lock to the first register corresponding to said second register, then transferring the content of said second register into said first register and releasing said write lock;
  if a write lock remains therein, determining if said lock belongs to a transaction the identifier of which is in said table of transactions; and:
    if yes, transferring the content of said second log into said second register, then releasing said write lock, then allocating a write lock to the first register corresponding to said second register, then transferring the content of said second register into said first register, and releasing said write lock;
    if no, clearing the content of said second log and then releasing said write lock;

finally, clearing all transaction identifiers in said table.

3. Protocol according to claim 2 wherein, in said restore procedure, the procedure to verify if any write lock remains in said second register consists in determining if a second log is associated with said second register.

4. System for implementing the protocol according to claim 1 including: at least one processor, a memory and means for executing a transaction including writing a new value of at least one variable stored in a register of said memory;

wherein said means for executing a transaction include, for a write operation, for each variable:

means for allocating a write intention lock to said transaction for the register corresponding to said variable preventing writing in said register by any transaction other than the transaction to be closed, but allowing reading;

means for associating a log register with said register and storing therein said new value of said variable;

and the means for executing a transaction further include, for said closure of said transaction:

means for determining each register to which a write intention lock has been allocated for said transaction to be closed;

means for releasing any read lock allocated to said transaction to be closed;

means for verifying for any register holding a write intention lock for said transaction to be closed that there remains in said register no read lock allocated to any transaction and, if at least one read lock remains for a time period greater than a fixed limit, executing a procedure for aborting said transaction to be closed; and if not, converting said write intention lock into a write lock and then, for any register holding a write lock, for said transaction to be closed:
  transferring said new value of said variable from said log to said register;
  and releasing said write lock allocated to said transaction to be closed for said register;

means for sending a "transaction deemed completed" message to an application that requested the closure of said transaction;

and the means for executing the procedure for aborting said transaction to be closed include:

means for clearing the content of each log storing the value of a variable modified by said aborted transaction;

means for releasing write locks and write intention locks allocated to said aborted transaction;

means for sending a "transaction aborted" message to said application that requested the closure of said transaction.

5. System for implementing the protocol of claim 2 including: at least one processor, a volatile memory, a non-volatile memory and means for executing a transaction including writing of a new value of at least one variable stored in a first register of said volatile memory and in a second register of said non-volatile memory;

wherein said means for executing a transaction include, for a write operation, for each variable:

means for allocating a write intention lock to said transaction for the first register corresponding to said variable prohibiting writing in said first register by any transaction other than said transaction to be closed, but allowing reading;

means for associating a first log register with said first register and storing therein said new value of said variable;

and said means for executing a transaction include, for closing said transaction:

means for determining each first register to which a write intention lock has been allocated for said transaction to be closed and for determining the corresponding second register in said non-volatile memory;

means for allocating to each of said second registers thus determined a write lock for said transaction to be closed, prohibiting writing by any other transaction;

means for associating with each of said second registers thus determined a second log register and storing therein said new value of said variable;

means for writing the identifier of said transaction in a table of transactions stored in said non-volatile memory;

means for releasing any read lock allocated to said transaction to be closed;

for any first register holding a write intention lock, for said transaction to be closed, means for verifying that there remains in said register no read lock allocated to any transaction and, if at least one read lock remains for a time period greater than a fixed limit, executing a procedure to abort said transaction to be closed; and otherwise converting said write intention lock into a write lock and then, for any first register holding a write lock, for said transaction to be closed:

transferring said new value of said variable from said log to said register;

and releasing said write lock allocated to said transaction to be closed for said register;

means for sending a "transaction deemed complete" message to an application that requested closure of said transaction;

means for writing in said table an indicator associated with said identifier of said transaction and indicating that it is deemed completed;

for any second register holding a write lock, for said transaction to be closed, means for:

transferring said new value of said variable from said second log to said second register;

then releasing said write lock allocated to said transaction for said first register;

and means for clearing the identifier of said transaction in said table;

and said means for executing said procedure for aborting said transaction to be closed include:

means for clearing the content of each first log holding the value of a variable modified by the aborted transaction;

means for releasing write intention locks and write locks allocated to said aborted transaction;

means for clearing the identifier of said transaction to be closed in said table;

means for sending a "transaction aborted" message to said application that requested closure of said transaction;

means for clearing the content of each second log storing the value of a variable modified by said aborted transaction;

means for releasing said write locks allocated to said aborted transaction for second registers;

and in that said system further includes means for restoring the content of said volatile memory after failure thereof, said means including:

means for verifying, for each second register of said non-volatile memory, whether a write lock remains in said register, and:

if no write lock remains therein, allocating a write lock to the first register corresponding to said second register, then transferring the content of said second register into said first register and releasing said write lock;

if any write lock remains therein, determining if said lock belongs to a transaction the identifier of which is in said table of transactions; and:

if yes, transferring the content of said second log into said second register, then releasing said write lock, then allocating a write lock to the first register corresponding to said second register, then transferring the content of said second register into said first register, and releasing said write lock;

if no, clearing the content of said second log then releasing said write lock;

finally, clearing all transaction identifiers in said table.

* * * * *